United States Patent [19]

Marzolf

[11] 3,908,070

[45] Sept. 23, 1975

[54] MULTILAYER THERMOPLASTIC BARRIER STRUCTURE

[75] Inventor: Richard T. Marzolf, Midland, Mich.

[73] Assignee: The Dow Chemical Company, Midland, Mich.

[22] Filed: Apr. 24, 1972

[21] Appl. No.: 246,822

[52] U.S. Cl............. 428/474; 260/897 B; 426/127; 426/398; 428/520; 428/516; 428/518; 428/523; 428/421; 428/422

[51] Int. Cl.$^2$..................... B32B 27/06; C08L 23/04

[58] Field of Search........... 161/165, 227, 254, 256, 161/247; 99/174, 178, 179; 260/897 R, 897 B; 426/124, 126, 127, 398; 117/161 N, 161 UH, 138.8 N

[56] References Cited
UNITED STATES PATENTS

| | | | |
|---|---|---|---|
| 3,297,518 | 1/1967 | Maschner et al.................... | 161/247 |
| 3,370,972 | 2/1968 | Nagel et al............................. | 117/7 |
| 3,423,231 | 1/1969 | Lutzmann.......................... | 117/68.5 |
| 3,475,267 | 10/1969 | Miles.............................. | 260/88.1 R |
| 3,485,783 | 12/1969 | Kehe................................ | 260/897 B |
| 3,514,367 | 5/1970 | James................................ | 161/165 |
| 3,549,389 | 12/1970 | Peterson........................... | 426/127 |
| 3,560,227 | 2/1971 | Eichorn et al..................... | 426/127 |
| 3,570,748 | 3/1971 | Coyle et al........................ | 161/247 |
| 3,579,416 | 5/1971 | Schrenk............................ | 161/254 |
| 3,600,468 | 8/1971 | Bohme............................ | 260/897 B |
| 3,607,519 | 9/1971 | Beyer et al........................ | 156/331 |
| 3,630,826 | 12/1971 | Rose et al......................... | 161/190 |
| 3,661,677 | 5/1972 | Wang................................. | 156/315 |
| 3,673,050 | 6/1972 | Newman et al................... | 161/254 |
| 3,697,368 | 10/1972 | Bhuta et al. ................. | 117/138.8 N |
| 3,704,157 | 11/1972 | McDonald...................... | 260/897 B |

Primary Examiner—George F. Lesmes
Assistant Examiner—R. J. Roche
Attorney, Agent, or Firm—Arthur J. Young

[57] ABSTRACT

A multilayered thermoplastic structure with excellent gas and water vapor barrier characteristics having an inner-barrier layer which is adhesively bonded to a polyolefin resin layer on one side and to a nylon resin layer on the other side. The multilayered thermoplastic structure can be easily formed by coextrusion.

7 Claims, No Drawings

MULTILAYER THERMOPLASTIC BARRIER STRUCTURE

BACKGROUND OF THE INVENTION

1. Field of the Invention

This invention relates to a multilayered thermoplastic structure having excellent gas and water vapor barrier characteristics, with particular reference to a structure having an inner-barrier layer which is adhesively bonded to a polyolefin resin layer on one side and to a nylon resin layer on the other side.

In general, packaging of many products or articles requires a material which exhibits excellent resistance to the transmission of gases and/or water vapor. For example, when packaging food products in flexible films such as butter, soft cheese, margarine, fresh meat and the like, which are sensitive to water vapor and/or oxygen, it is essential that the packages utilized provide good barrier properties. Packaging of many other products such as beverages, both carbonated and noncarbonated, shelf-stable meat products, fruits, vegetables, nuts, drugs or medicines, oils or lotions and the like also requires packages which are formed from a material having similar barrier properties. Because of this wide range of packaging requirements, it is often necessary to provide barrier properties in both thin flexible films and/or rigid or semi-rigid sheetings used to form rigid or semi-rigid containers.

There are many other characteristics of thermoplastic resinous materials utilized to form films or sheetings which should be considered in conjunction with barrier properties. Plastic materials used in packaging should not impart a taste or odor to a food product packaged therein, and further should provide other properties such as good formability, stiffness when forming rigid containers, impact resistance, scuff resistance, chemical inertness, resistance to imbrittlement at low temperatures, resistance to tear and good heat sealability.

2. Description of the Prior Art

It is difficult if not impossible to achieve all of the desired properties required of a specific packaging film or sheeting when only one plastic material is utilized to form the same. In this regard, many multilayered structures useful in packaging have been recently developed to combine the best characteristics of several different materials. Examples illustrating multilayered packaging structures are shown in U.S. Pat. Nos. 3,297,518, 3,524,795 and 3,645,838.

As noted in U.S. Pat. No. 3,297,518, polyamides (commonly referred to as nylon) are potentially useful thermoplastic resinous materials for forming multilayered packaging structures. Nylon is a desirable material because it provides good formability, stiffness, scuff resistance and gloss properties. Its use as a packaging material, however, has been severely limited because of a relatively high material cost. In addition, its use has been further limited because of its poor bonding compatibility with common barrier layer materials such as polymers or copolymers of vinylidene chloride or acrylonitrile and structural support layer materials such as polyolefins. This incompatibility has invariably necessitated resorting to unusual adhesive lamination means such as thermosetting polyurethanes or epoxy modified polyesters. However, it has been discovered that a novel coextruded multilayered structure incorporating a nylon layer can be formed by utilizing satisfactory thermoplastic adhesive layers, as provided in the present invention.

SUMMARY

In general, this invention provides a novel multilayered thermoplastic structure useful as a packaging material which is preferably formed by coextrusion. More particularly, the invention provides a multilayered thermoplastic film or sheeting comprising an inner gas and/or water vapor barrier layer which is adhesively bonded to a body supporting polyolefin resin layer on one side and to a nylon resin layer on the other side.

Polyolefins are herein defined as polyethylene, polypropylene, resinous copolymers of ethylene and propylene and polymers of ethylene and/or propylene with minor proportions of olefinically unsaturated monomers such as, for example, those alpha-olefins having from 2 to 8 carbon atoms such as 1-butene, 1-pentene, 1-hexene, 1-heptene, 1-octene and mixed higher alpha-olefins. Other hydrocarbons useful for making copolymers with ethylene and propylene include divinylbenzene, allene, dimethallyl and isopentene. Comonomers which can broadly be used include mono-substituted ethylenes such as 1-pentene, vinylcyclohexene, allyl benzene, $C_8$–$C_{14}$ mixed alpha-olefins, styrene, allyl naphthalene, and the like; 1,1-disubstituted ethylenes such as alpha-methyl styrene, 2-methylbutene-1, mixed alpha- and beta-pinenes, camphene and the like; 1,2-disubstituted ethylenes such as indene, acenaphthylene, cyclopentene, norbornylene, cyclohexene, trans-stilbene, 2-pentene and the like; conjugated dienes and trienes such as pentadiene-1,3, 1,2-dihydrobenzene, bicycloheptadiene, bicyclopentadiene, 4-vinylcyclohexene-1, and 4,7-diphenyldecadiene-1,9; acethylenes such as isopropenyl acetylene and phenyl acetylene; chloroolefins such as beta-methallyl chloride and chloromethyl norbornylene; and m-chlorostyrenes, ethers and epoxides; esters such as vinyl butyrate, vinyl acetate, and methyl acrylate; and nitrogen compounds such as vinyl carbozole, 4-vinyl pyridine and acrylonitrile, and mixtures and blends thereof.

When forming relatively thin flexible multilayered film structures in accordance with the present invention, it is most preferable to use low density polyolefins, such as polyethylene having a density of about 0.94 or less, wherein the same have an A.S.T.M. D-790 flex modulus of about 150,000 psi. or less. When forming relatively thick rigid or semi-rigid multilayered sheeting structures, useful in forming rigid containers, it is most preferable to use high density polyolefins, such as polyethylene having a density of about 0.94 or higher, wherein the same have an A.S.T.M. D-790 flex modulus of about 150,000 psi. or greater.

A wide variety of barrier materials may be employed in the central layer of flexible films and rigid or semi-rigid sheetings made in accordance with the present invention. Particularly suited as barrier layers are acrylonitrile polymers, and other combinations of vinylidene chloride polymers, vinyl chloride polymers, vinylidene fluoride polymers and extrudable mixtures thereof. The main requirement for the central layer is that its composition have the desired gas and moisture vapor transmission barrier characteristics. Particularly advantageous and beneficial are extrudable compositions of vinylidene chloride copolymers wherein the same contain at least about 70 weight percent vinylidene chloride and a remainder of one or more olefinically unsaturated monomers copolymerizable therewith. Suitable vinylidene chloride copolymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid, methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbozole, isopropenyl acetate, acrylamide, methacrylamide or monoalkyl substitution products thereof, phenyl vinyl ketone, diethyl fumarate, diethyl maleate, methylene diethyl malenate, dichlorovinylidene fluoride, dimethyl itaconate, diethyl itaconate, dibutyl itaconate, vinyl pyridine, maleic anhydride and allyl glycidyl ether. Other barrier compositions which may be used with benefit in films or sheetings in accordance with the present invention are vinyl chloride polymers which contain a predominant amount of vinyl chloride therein. Fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like might also be useful. Generally, for economic reasons, the vinylidene chloride polymers are employed, as they are most readily available at relatively low cost.

Beneficially, in the forming of the vinylidene polymers, it is frequently advantageous and beneficial to incorporate therein a minor portion of a plasticizer, a heat stabilizer and/or a light stabilizer. Such additives are well known in the art and generally are found advantageous in that the temperature required for the forming operation is substantially reduced and the probability of decomposing the polymer is lowered. Typical plasticizers which are employed in the vinylidene chloride combinations are acetyl tributyl citrate, epoxidized soybean oil (commercially available under the trade designation of Paraplex G-60), dibutyl sebacate, and polymeric plasticizers such as, for example, certain copolymers of ethylene and vinyl acetate.

Nylon as herein defined is a generic term for any long chain synthetic polyamide which has reoccurring amide groups as an integral part of a main polymer chain. Nylon does not refer to a particular product but rather to a generic family of chemically related compounds. Examples of specific nylon polymers which can be beneficially used are nylon-4, nylon-6, nylon-12 and nylon-66.

A wide variety of thermoplastic resinous polymer or copolymer compositions are useful in promoting adhesion between the outer nylon and polyolefin layers, and the inner-barrier layer. However, it should be noted that adhesive compositions which are compatible with the olefin outer layer and the barrier layer generally are not compatible with the nylon layer. Also, other adhesive compositions which are compatible with the nylon layer or the polyolefin layer may not be compatible with the barrier layer. More particularly, examples of adhesive compositions illustrating the two groups can be described as follows:

GROUP 1

Adhesive Compositions Compatible with the Polyolefin and Barrier Layers but not Generally Compatible with the Nylon Layer Copolymers of ethylene and vinyl acetate, advantageously in proportions of from about 14 weight percent to about 40 weight percent vinyl acetate with from about 86 weight percent to about 60 weight percent ethylene; copolymers of ethylene and ethyl acrylate, advantageously in proportions of from about 20 to about 30 weight percent ethyl acrylate with from about 80 to about 70 weight percent ethylene; copolymers of ethylene and isobutyl acrylate, advantageously in proportions of from about 20 to about 30 weight percent isobutyl acrylate with from about 80 to about 70 weight percent ethylene; and chlorinated polymers or copolymers of ethylene, advantageously containing from about 15 to about 40 weight percent chlorine. Blends of such adhesive compositions may also be employed.

GROUP 2

Adhesive Compositions Compatible with the Nylon Layer but not Generally with the Barrier Layer Copolymers of ethylene and monocarboxylic acids such as acrylic acid or methacrylic acid which have functional groups promoting good adhesion to nylon. The copolymers of ethylene and monocarboxylic acids can vary from about 3 to about 30 weight percent monocarboxylic acid and about 97 to about 70 weight percent ethylene.

It has been discovered that by properly blending or mixing the two groups of adhesive compositions, a satisfactory thermoplastic adhesive system is provided for the multilayered structures of the present invention which will allow the use of known coextrusion techniques to form the same. Suitable blends or mixtures of at least one composition from each of the above groups readily provides the bond strength requirements for the multilayered structures.

Bond strength of the multilayered structures can be accurately determined on conventional adhesion testing equipment. Advantageously, bond strengths of about 2 to 4 pounds per inch or greater in the multilayered structures of the present invention were achieved by utilizing blends or mixtures of at least one from each group of the two above types of adhesives in a range of from about 25 to about 75 weight percent. More preferably, a 50–50 weight percent blend of the two groups can be utilized to obtain adhesion strengths of even greater magnitude.

The total thickness of the multilayered structure of the present invention is arbitrarily determined by whether it is formed as a flexible film or as a rigid or semi-rigid sheeting material. Advantageously, flexible film structures contemplated in the present invention will range from about 0.4 to about 10 mils in thickness and rigid or semi-rigid sheeting structures will range from about 10 mils to about 300 mils in thickness. The outer olefin layer can be from about 5 to about 200 mils thick and is preferably from about 10 to about 40 mils thick for a rigid or semi-rigid sheeting. For a flexible film structure the outer olefin layer can be from about 0.1 to about 5 mils thick and is preferably from about 0.5 to about 3 mils thick. The nylon layer can be from about 1 to about 50 mils thick and is preferably about 5 to about 20 mils thick for a sheeting, and can be about 0.1 to about 3 mils thick and is preferably about 0.5 to about 1.5 mils thick for a flexible film. The barrier layer can be from about 0.5 to about 40 mils thick and is preferably from about 1.5 to about 20 mils thick for a sheeting, and can be about 0.1 to about 1.5 mils thick and is preferably about 0.2 to about 0.5 mils thick for a flexible film. Each adhesive layer may vary in thickness from about 0.2 to about 5 mils for a sheeting structure; however, generally the preferred adhesive layer thickness is about 2 mils. For a flexible film structure, the adhesive layer can be about 0.1 to about 0.5 mils thick and is preferably about 0.2 mils thick.

The film and sheeting structures of the present invention are suited for making containers of a variety of forms for products that are sensitive to oxygen, carbon dioxide and other gases, or moisture; products that have an elusive fragrance that is desirably retained; products that may pick up unwanted odors from the environment and/or products that contain highly volatile components. Products that can be advantageously packaged in a film or sheeting structure of this invention include, for example, cheese, butter, steroids, various drugs and medicines, dried foods and shelf stable meat products such as corn beef hash, chili con carne, and the like.

DESCRIPTION OF THE PREFERRED EMBODIMENTS

The following examples illustrate the manner in which the principles of the invention are applied but are not to be construed as limiting the scope of the invention:

EXAMPLE 1

A five layer flexible film was prepared by the coextrusion of an outer layer of polyethylene having a melt index of 3.0 and a density of 0.92; a core barrier layer comprising 96 parts by weight of a copolymer of 85 weight percent vinylidene chloride and 15 weight percent vinyl chloride, 3 parts by weight of a copolymer of 67 weight percent ethylene and 33 weight percent vinyl acetate having a melt of index of 22–28 and a density at 23°C. of 0.957 and 1 part by weight of tetrasodium pyrophosphate; an outer layer of nylon 12 (sold under the trade designation NYLON-12 L1201-2 by Chemische Werke); and two adhesive layers comprising a 50–50 weight blend of an ethylene-vinyl acetate copolymer containing 28 weight percent vinylacetate (sold under the trade designation ELVAX 260) and having a melt index of 6 and a density of 0.954, and an ethylene-acrylic acid copolymer containing 8 weight percent acrylic acid and having a melt index of 5 and a density of 0.93. The outer nylon layer was 1 mil thick, the outer polyethylene layer was 1.7 mils thick, the core barrier layer was 0.4 mils thick and each of the adhesive layers was 0.2 mils thick.

EXAMPLE 2

As a teaching example, a 5 layer sheeting structure can be prepared by the coextrusion of an outer layer of polyethylene having a melt index of 6.0 and a density of 0.96; and a core barrier layer, an outer nylon layer and two adhesive layers all having the same compositions as Example 1. The outer polyethylene layer may have a thickness of about 35 mils, the core barrier layer about 5 mils thick, the nylon layer about 3 mils thick and the adhesive layers each about 2 mils thick.

It is understood that the scope of this invention is not limited by any specific technique of forming thermoplastic multilayered structures or to individual layers having specific compositions. It is further understood that the invention is not limited by the thickness or flexibility of the thermoplastic layers forming the multilayered structures. Thus, while certain representative embodiments and details have been shown for the purposes of illustrating the invention, it will be apparent to those skilled in the art that various changes and modifications can be made therein without departing from the spirit and scope of the invention.

What is claimed is:

1. A thermoplastic multilayered structure useful as a packaging material comprising a gas and water vapor barrier core layer, juxtaposed thermoplastic adhesive layers on each side of said barrier layer, an outer polyolefin resin layer secured to one of said adhesive layers and an outer nylon layer secured to another of said adhesive layers, said barrier comprising a continuous coherent layer of a copolymer of vinylidene chloride and one or more olefinically unsaturated monomers copolymerized therewith, said adhesive layer comprising a blend, one of said blend components comprising a copolymer of ethylene and monocarboxylic acid and another of said blend components selected from a group consisting of a copolymer of ethylene and vinyl acetate, a copolymer of ethylene and ethyl acrylate, a copolymer of ethylene and isobutyl acrylate and chlorinated polymers of ethylene containing about 15 to 40 weight percent chlorine, said blend having a range of about 25 to about 75 weight percent of said blend components.

2. The multilayered structure of claim 1 wherein said outer polyolefin resin layer is a polyethylene layer.

3. The multilayered structure of claim 2 wherein said polyethylene layer is composed of a low density polyethylene having a density of less than about 0.94 and a thickness of about 5 mils or less.

4. The multilayered structure of claim 2 wherein said polyethylene layer is composed of a high density polyethylene having a density of about 0.94 or greater and a thickness of about 5 mils or greater.

5. The multilayered structure of claim 1 wherein said structure has a total thickness of from about 0.4 to about 300 mils, said outer polyolefin layer has a thickness of from about 0.1 to about 200 mils, said outer nylon layer has a thickness of from about 0.1 to about 50 mils, said barrier layer has a thickness of from about 0.1 to about 40 mils and each of said adhesive layers has a thickness of from about 0.1 to about 5 mils.

6. The multilayered structure of claim 1 wherein said adhesive layers comprise a blend or mixture of a copolymer of ethylene/vinyl acetate and a copolymer of ethylene/acrylic acid.

7. The multilayered structure of claim 6 wherein said blend or mixture is about 50/50 weight percent of ethylene/vinyl acetate copolymer and ethylene/acrylic acid copolymer.

* * * * *